(12) United States Patent
Sase et al.

(10) Patent No.: US 7,615,980 B2
(45) Date of Patent: Nov. 10, 2009

(54) MARGINAL CHECK VOLTAGE SETTING MEANS BUILT-IN POWER-SUPPLY DEVICE

(75) Inventors: Takashi Sase, Hitachi (JP); Akihiko Kanouda, Hitachinaka (JP); Yosuke Kawakubo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 184 days.

(21) Appl. No.: 11/320,872

(22) Filed: Dec. 30, 2005

(65) Prior Publication Data

US 2007/0120540 A1 May 31, 2007

(30) Foreign Application Priority Data

Nov. 30, 2005 (JP) ............................. 2005-346629

(51) Int. Cl.
*G05F 1/40* (2006.01)
(52) U.S. Cl. ...................................... 323/284
(58) Field of Classification Search ................. 323/282, 323/283, 284, 285, 222, 266
See application file for complete search history.

(56) References Cited

U.S. PATENT DOCUMENTS

| | | | | |
|---|---|---|---|---|
| 5,917,311 A * | 6/1999 | Brokaw | ....................... | 323/280 |
| 6,172,495 B1 * | 1/2001 | Washburn | ................... | 323/316 |
| 6,403,943 B2 * | 6/2002 | Wada et al. | ............. | 250/214 A |
| 6,650,173 B1 * | 11/2003 | Khouri et al. | ............... | 327/538 |
| 6,798,180 B2 * | 9/2004 | Sase et al. | .................... | 323/282 |
| 2003/0231010 A1 | 12/2003 | Sase et al. | | |
| 2005/0029997 A1 | 2/2005 | Sase et al. | | |
| 2005/0127881 A1 | 6/2005 | Sase et al. | | |
| 2005/0127886 A1 | 6/2005 | Sase et al. | | |
| 2006/0176038 A1 * | 8/2006 | Flatness et al. | ............. | 323/282 |

FOREIGN PATENT DOCUMENTS

| | | |
|---|---|---|
| JP | 2004-080985 | 3/2004 |
| JP | 2005-184870 | 7/2005 |

* cited by examiner

*Primary Examiner*—Adolf Berhane
(74) *Attorney, Agent, or Firm*—Mattingly & Malur, P.C.

(57) ABSTRACT

A power-supply device including a marginal check voltage setting circuit that is easily adaptable to downsizing of the device and to configuration using ICs. The power-supply device of this invention includes a marginal check voltage setting circuit that sets a desired marginal check voltage, an error amplifier that delivers output of an error signal, a pulse width modulation oscillator that modulates the pulse width of the output from the error amplifier, a driver circuit that generates driving signal from the pulse signal originating from the pulse width modulation oscillator, and a pair of power semiconductor switching devices that work to step down the input voltage and generate an output voltage based on the driving signal. Furthermore, the power-supply device is also provided with an over-voltage detection circuit and a power-good circuit both circuits being positioned at the output terminal of the marginal check voltage setting circuit.

20 Claims, 11 Drawing Sheets

MARGINAL CHECK VOLTAGE SETTING MEANS BUILT-IN POWER-SUPPLY DEVICE

FIELD OF THE INVENTION

This invention relates to a power-supply device with a built-in marginal check voltage setting circuit, and particularly to a power-supply device functioning as a step-down DC-DC converter.

BACKGROUND OF THE INVENTION

In the manufacturing process of information processing equipments for controlling hard disk devices and other related devices, it is customary to conduct a voltage marginal check as a part of quality assurance testing procedure. In the voltage marginal check, marginal check voltage which is obtained by varying feedback voltage from the power-supply device or the reference voltage upward and downward within a certain range is used to check if logical circuits or memories of semiconductor devices are in proper working condition.

Japanese published and unexamined patent application gazette H11-352195 refers to exercising voltage marginal check for the information processing equipment that has no provision of interface for voltage marginal check, by inserting a voltage marginal check power-supply device between the power-supply device and the logical board or device.

Japanese published and unexamined patent application gazette H5-232197 refers to a voltage regulator circuit, which, built-in in an integrated circuit, can perform marginal check of source voltage. Also, Japanese published and unexamined patent application gazette H7-280889 refers to a voltage marginal test method, according to which turning on a test switch enables the test program to operate and vary the output source voltage to upper limit, lower limit and specified values.

[Patent Document 1] Japanese published and unexamined patent application gazette H11-352195

[Patent Document 2] Japanese published and unexamined patent application gazette H5-232197

[Patent Document 3] Japanese published and unexamined patent application gazette H7-280889

SUMMARY OF THE INVENTION

In order to perform voltage marginal check, the prior art power-supply device requires insertion of a voltage marginal check power-supply device, and this makes downsizing and adoption of ICs difficult. Also, it is difficult to set a desired value for the marginal check voltage.

What is regarded a problem in the voltage marginal check as a part of quality assurance testing procedure for the information processing equipment is the relationship between power-good and over-voltage detection. In the prior art technique, the power-good circuit generating power-good signals and the over-voltage detection circuit generating over-voltage detection signals have been provided separately from the marginal check voltage setting circuit. Accordingly, when marginal check voltage is varied, there occurs the condition that the marginal check voltage exceeds the range of power-good voltage. If the marginal check voltage exceeds the range of power-good voltage, the information processing equipment gets in a state of error and becomes unable to exercise the voltage marginal check.

This invention has its objective in providing such a power-supply device having a marginal check voltage setting circuit that is easy and suitable for downsizing and adoption of integrated circuits.

The power-supply device in the present invention functions as a step-down DC-DC converter which takes DC input voltage at the input terminal and delivers stepped-down output voltage from the output terminal.

The power-supply device in the present invention comprises a marginal check voltage setting circuit which inputs a reference voltage to set a desired marginal check voltage, an error amplifier which with the input of the marginal check voltage and said output voltage outputs the difference between the two as an error signal, a pulse width modulation oscillator which modulates said output from the error amplifier in pulse width, a driver circuit which generates driving signals from the pulse signals from the pulse width modulation oscillator, and a pair of power semiconductor switching devices which step down said DC input voltage in accordance with the driving signals from the driver circuit to generate said DC output voltage.

According to this invention, the abovementioned marginal check voltage setting circuit includes an upper limit marginal check voltage generating circuit which, based on the input reference voltage, generates upper limit marginal check voltage, a resistor network composed of a plurality of series-connected resistors, and an array of switches including a plurality of switches connected to the resistor network; and a desired marginal check voltage increased or decreased from the reference voltage by a certain ratio is available by closing one of a plurality of switches abovementioned.

According to this invention, an over-voltage detection circuit to set over-voltage detection reference voltage and a power-good circuit to set a power-good determination reference voltage are provided at the output terminal of said marginal check voltage setting circuit.

The present invention provides the power-supply device with a built-in marginal check voltage setting circuit which is suitable for downsizing and adoption of integrated circuits. Further, implementation of the present invention will prevent any discordance that otherwise may happen between the marginal check voltage and the over-voltage detection reference voltage or the power-good reference voltage.

DETAILED DESCRIPTION OF THE PREFERRED EMBODIMENTS

Figure 1:
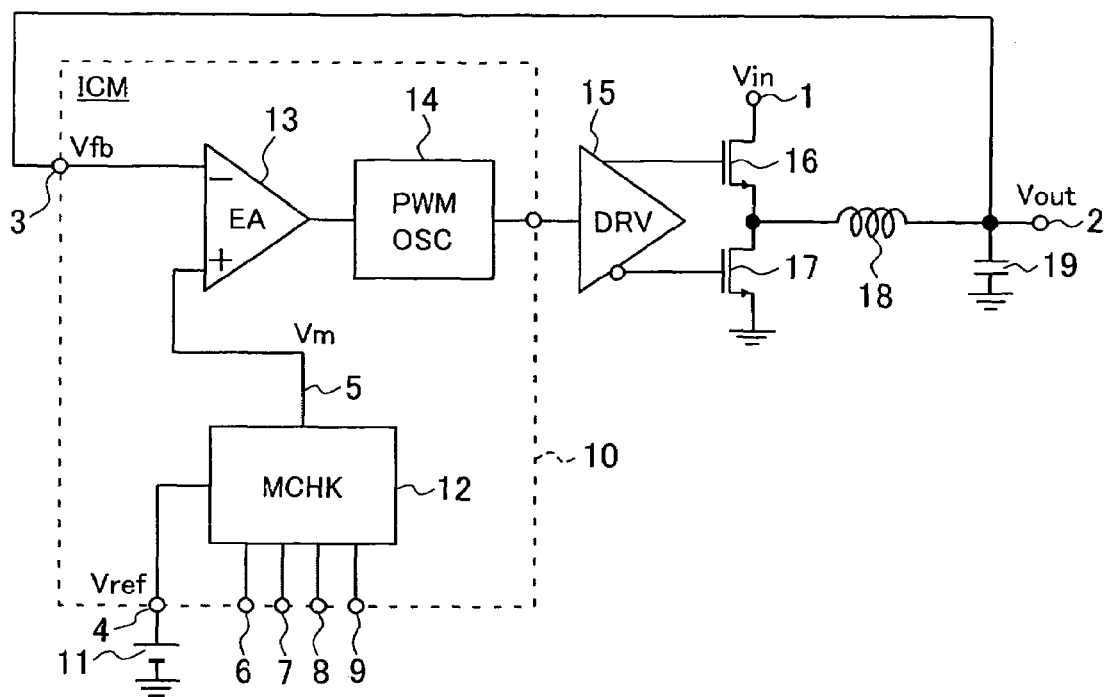
FIG. 1 is an illustration showing an example of the power-supply device of the present invention.

FIG. 1 shows one embodiment of the power-supply device according to the present invention. The power-supply device in this embodiment comprises a marginal check voltage setting circuit 12, an error amplifier 13, a pulse width modulation oscillator 14, a driver 15, a pair of power MOSFET 16 and 17, an inductor 18, and a capacitor 19. An LC smoothing filter is formed by the inductor 18 and the capacitor 19.

The drain of the upper-side power MOSFET 16 is connected to the input terminal 1 of the power-supply device, and the source of the lower-side MOSFET 17 is earthed. The joint point between the source of the upper-side power MOSFET 16 and the drain of the lower-side MOSFET 17 is connected to the output terminal 2 of the power-supply device via the LC smoothing filter. The output voltage Vout at the output terminal 2 is fed back to the feedback voltage terminal 3 as the feedback voltage Vfb (=Vout).

First of all, the case where the power-supply device in this embodiment functions as a normal step-down type converter is described briefly. From the reference voltage source 11, the reference voltage Vref is input to the marginal check voltage setting circuit 12, and by setting up digital codes on the digital setting terminals 6 through 9, the marginal check voltage Vm is output from the output terminal 5.

With respect to the error amplifier 13, the marginal check voltage Vm is input to the positive input terminal and the feedback voltage Vfb is input to the negative input terminal. The error amplifier 13 generates the difference between the reference voltage Vref and the feedback voltage Vfb, namely the error voltage, and amplifies it to output the same to the pulse width modulation oscillator 14. The pulse width modulation oscillator 14 modulates the error voltage in width and outputs the modulated error voltage to the driver 15. The driver 15 converts the modulated pulses into on-off signals and outputs the same to the gate of the power MOSFETs 16 and 17. The upper-side power MOSFET 16 and the lower-side power MOSFET 17 are driven alternately according to the on-off signals from the driver 15. The input voltage Vin applied to the input terminal 1 is converted, by the function of the upper-side power MOSFET 16 and the lower-side power MOSFET 17, into a pulse-form voltage between the input voltage Vin and the ground potential, smoothed by the LC smoothing filter, and then put up on the output terminal 2 as an output voltage Vout.

The output voltage Vout is then returned via the feedback voltage connection terminal 3 to the error amplifier 13 as a negative feedback voltage Vfb (=Vout). Thus, the error voltage from the error amplifier 13 becomes zero, and the output voltage Vout at the output terminal 2 becomes equal to a desired reference voltage Vref.

The output voltage Vout available at the output terminal 2 is proportional to the input voltage Vin applied to the input terminal 1 and to the duty α. Accordingly, this can be expressed by the following equation.

$$Vout = Vfb = Vref = \alpha \cdot Vin \quad \text{(Equation 1)}$$

From this equation, the duty α can be obtained as follows.

$$\alpha = Vout/Vin \quad \text{(Equation 2)}$$

Therefore, the duty α means voltage transfer factor. The duty α is determined by the on/off time of the power MOSFET 16.

$$\alpha = Ton/(Ton+Toff) \quad \text{(Equation 3)}$$

Ton means "on" time and Toff means "off" time. Naturally, duty α has a value between 0 and 1.

In the next place, the case where the marginal check voltage setting circuit 12 outputs a desired marginal check voltage Vm is explained. From the reference voltage source 11, the reference voltage Vref is input to the marginal check voltage setting circuit 12, and according to the digital codes set up on the digital setting terminals 6 through 9, a desired marginal check voltage Vm is set up and output from the output terminal 5 of the marginal check voltage setting circuit 12.

The marginal check voltage Vm is input to the error amplifier 13 via the positive input terminal, while the feedback voltage Vfb is likewise input via the negative input terminal. The error amplifier 13 generates the difference between the marginal check voltage Vm and the feedback voltage Vfb (=Vout), namely the error voltage, and amplifies it to output the same to the pulse width modulation oscillator 14. The pulse width modulation oscillator 14 modulates the error voltage in width and outputs the modulated error voltage to the driver 15. The driver 15 converts the modulated pulses into on-off signals and outputs the same to the gates of the power MOSFET 16 and 17. The upper-side power MOSFET 16 and the lower-side power MOSFET 17 are driven alternately according to the on-off signals from the driver 15. The input voltage Vin applied to the input terminal 1 is converted, by the function of the upper-side power MOSFET 16 and the lower-side power MOSFET 17, into a pulse-form voltage between the input voltage Vin and the ground potential, smoothed by the LC smoothing filter, and then put up on the output terminal 2 as an output voltage Vout.

The output voltage Vout is then via the feedback voltage connection terminal 3 negatively fed back to the error amplifier 13 as a feedback voltage Vfb (=Vout). Thus, the error voltage from the error amplifier 13 becomes zero, and the output voltage Vout at the output terminal 2 becomes equal to a desired marginal check voltage Vm. Therefore, the equation 1 holds true if Vref is changed to Vm.

Explanation heretofore has taken up the power MOSFET as an example of semiconductor switching devices. In its place, however, other power switching devices may be used such as IGBT, GaN power devices, and SiC (silicon carbide) power devices.

In the example in FIG. 1, the digital codes that are set up at the digital setting terminals 6 through 9 of the marginal check voltage setting circuit 12 are of four bits but can be of increased or decreased number of bits, if necessary.

The portion surrounded by the broken line in FIG. 1, including the marginal check voltage setting circuit 12, the error amplifier 13, and the pulse width modulation oscillator 14, may be mounted on a power-supply IC 10. Furthermore, the power-supply IC 10 may also include the driver 15, and additionally the power MOSFETs 16 and 17, too.

Figure 2:
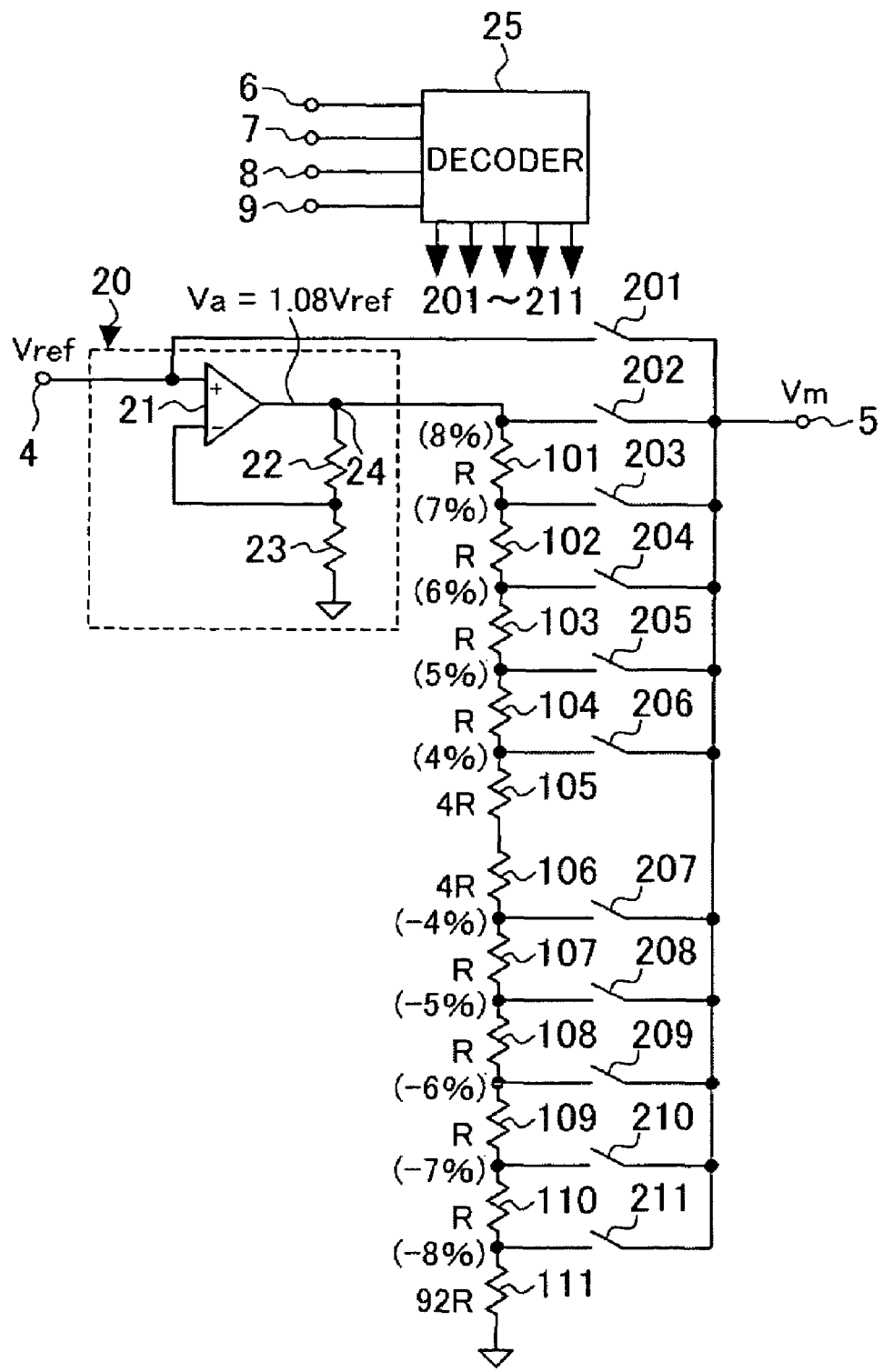
FIG. 2 is an illustration showing the first example of the marginal check voltage setting circuit of the power-supply device of the present invention.

FIG. 2 shows the first example of the marginal check voltage setting circuit 12 in the present invention. The marginal check voltage setting circuit 12 in this example comprises the input terminal 4 to receive the input of the reference voltage Vref, the upper limit marginal check voltage generating circuit 20 to generate the upper limit marginal check voltage Va, the resistor network composed of the resistors 101 through 111 connected to the output terminal 24 of the upper limit marginal check voltage generating circuit 20, the array of switches composed of switches 201 through 211, the output terminal 5 to output the marginal check voltage Vm, and the decoder 25.

The upper limit marginal check voltage generating circuit 20 is composed of the non-inverting amplifier comprising the operational amplifier 21 and the resistors 22 and 23. The operational amplifier 21 receives input of the reference voltage Vref and generates the upper limit marginal check voltage Va expressed by the following equation.

$$Va=(1+R1/R2)\cdot Vref \quad \text{(Equation 4)}$$

Where R1 and R2 are respectively the values of resistance of the resistors 22 and 23. In this example, the marginal check voltage Vm varies within the range of ±4% to ±8% of the reference voltage Vref. Therefore, the upper limit marginal check voltage Va is set 8% higher than the reference voltage Vref, that is, 1.08~Vref. For this purpose, the resistance values for the resistors 22 and 23 need to be chosen so as to satisfy R1/R2=0.08.

$$Va=(1+R1/R2)\cdot Vref=(1+0.08)\cdot Vref=1.08\cdot Vref \quad \text{(Equation 5)}$$

In this example, 11 pieces of resistors 101 through 111 composing the resistor network are respectively composed of one or a plurality of unit resistors. The unit resistor has a resistance value of "R." The first to fourth resistors 101 through 104 and seventh to tenth resistors 107 through 110 have a resistance value of "R" respectively, each consisting of one piece of unit resistor. The fifteenth and sixteenth resistors 105 and 106 respectively have a resistance value of "4R," each resistor composed of four pieces of unit resistors connected in series. The eleventh resistor 111 has a resistance value of 92R, composed of 92 pieces of unit resistors connected in series. Thus, in this example, each resistor composing the resistor network is composed of a plurality of unit resistors and divided into ratiometrically equal "n" sections. The making of resistors of this resistor network utilizes the relative accuracy of unit resistors, a method suitable for high-precision design for integrated circuits.

The resistance value "R" of the unit resistor is to be decided so as to correspond to 1% of the reference voltage Vref. In other words, the resistance value "R" is to be decided so that the voltage drop by the resistance value of "R" may correspond to 1% of the reference voltage Vref. In this way, the marginal check voltage Vm becomes available within the range of ±4% to ±8% of the reference voltage Vref with increase or decrease in steps of 1%.

By the function of the decoder 25, one of the switches in the array is to be selected, and the selected switch is closed. For example, when the first switch 201 is closed, the reference voltage Vref input to the input terminal 4 is output at the output terminal 5. In other words, the reference voltage Vref can be taken out bypassing the marginal check voltage setting circuit 12. In the present example, the first switch 201 should be closed, when the voltage marginal check does not need to be operated, that is, when the power-supply device is used only as a normal type of step-down DC-DC converter.

When the second switch 202 is closed, the upper limit marginal check voltage Va=1.08 Vref is output from the output terminal 5. In other words, the marginal check voltage Vm is available in the value of 1.08·Vref or 8% higher than the reference voltage Vref.

When the third switch 203 is closed, the upper limit marginal check voltage 1.08·Vref output from the upper limit marginal check voltage generating circuit 20 drops by 1% by going through the resistor 101. Therefore, the marginal check voltage output from the output terminal 5 is lower than the upper limit check voltage of 1.08·Vref by 1%, that is, 7% higher than the reference voltage Vref or Vm=1.07·Vref.

When the sixth switch 206 is closed, the upper limit marginal check voltage Va=1.08·Vref output from the upper limit marginal check voltage generating circuit 20 drops by 4% by going through the first, second, third and fourth resistors 101 through 104. Therefore, the marginal check voltage output from the output terminal 5 becomes 4% lower than the reference voltage Vref, that is, Vm=1.04·Vref. Likewise, when the seventh switch 207 is closed, the upper limit marginal check voltage 1.08·Vref output from the upper limit marginal check voltage generating circuit 20 drops by 12% by going through the first through sixth resistors 101 through 106. Therefore, the marginal check voltage output from the output terminal 5 becomes 4% lower than the reference voltage Vref, that is, Vm=0.96·Vref. When the 11th switch 211 is closed, the upper limit marginal check voltage 1.08·Vref output from the upper limit marginal check voltage generating circuit 20 drops by 16% by going through the first through 10th resistors 101 through 110. Therefore, the marginal check voltage output from the output terminal 5 becomes 8% lower than the reference voltage Vref, that is, Vm=0.92·Vref.

In the present case, the resistance value R of the unit resistor has been set at a value corresponding to 1% of the reference voltage, and thus, 108 pieces of unit resistors are required. However, if the resistance value R of the unit resistor is set at a value corresponding to 2% of the reference voltage Vref, 66 pieces of unit resistors will do. If this is the case, the total number and total area of unit resistors can be reduced by 38%. When the resistance value R of the unit resistor is determined to be a value corresponding to 4% of the reference voltage Vref, 57 pieces of unit resistors will be enough, resulting in a decrease of 47% in the total number and total area of the unit resistors.

In the present example, since the resistor network is composed of unit resistors, the marginal check voltage setting circuit 12 is easily adaptable to the configuration using integrated circuits. It is also possible to set a desired marginal check voltage in incremental steps and with high precision.

For the purpose of explanation here, the marginal check voltage Vm has been set at ±4% to ±8% of the reference voltage, but the marginal check voltage can not be limited to that range but may take other values.

Figure 3:
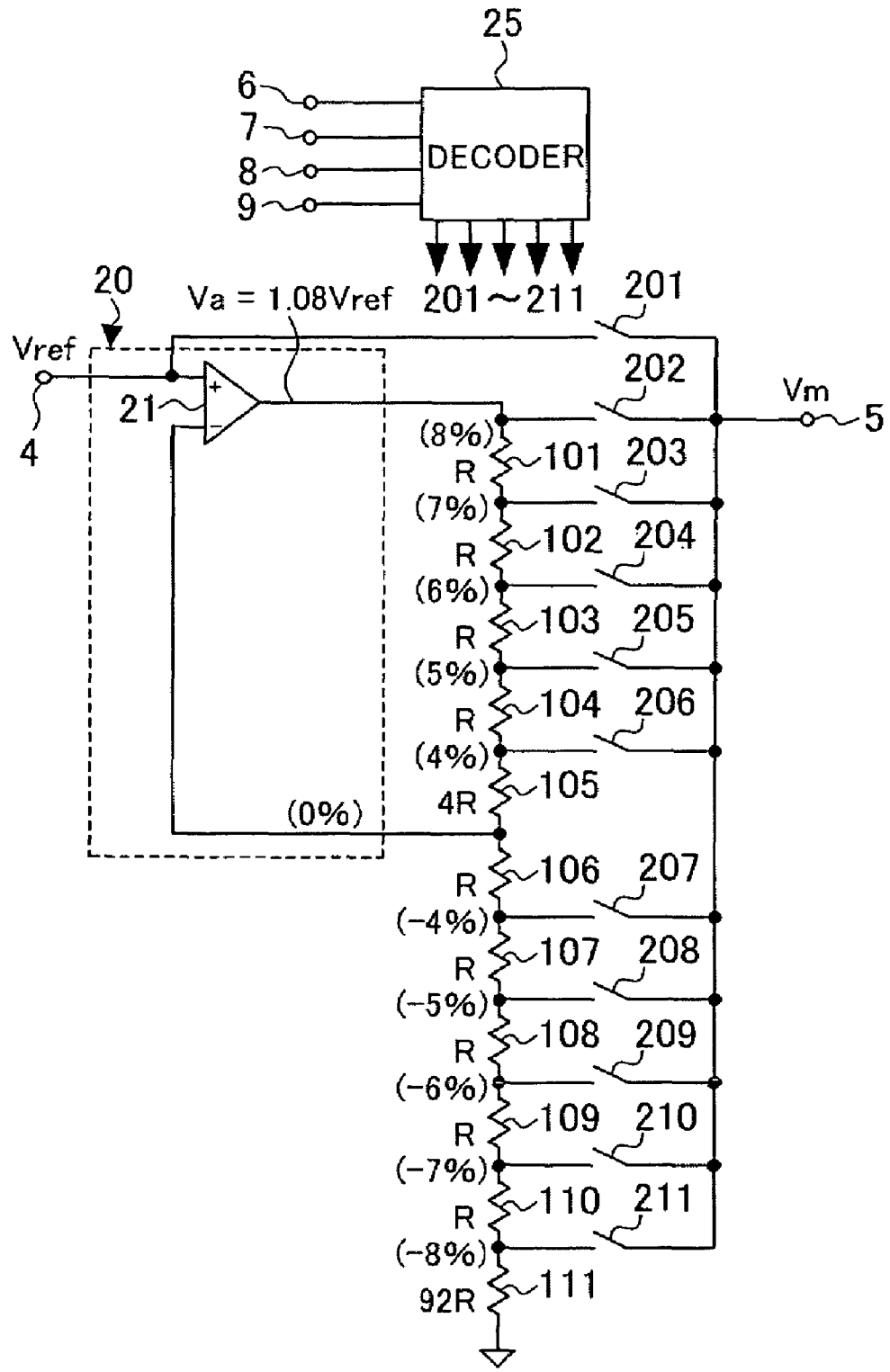
FIG. 3 is an illustration showing the second example of the marginal check voltage setting circuit of the power-supply device of the present invention.

FIG. 3 shows the second example of the marginal check voltage setting circuit 12 in the present invention. Comparison of this example of the marginal check voltage setting circuit 12 with the marginal check voltage setting circuit shown in FIG. 2 indicates that this example does without the resistors 22 and 23 of the upper limit marginal check voltage generating circuit 20 but in their places the negative input terminal of the operational amplifier 21 is connected to the midpoint between the fifth resistor 105 and the sixth resistor 106.

Substitute γ for the ratio of the summation of resistance value of the first through fifth resistors 101 through 105 to the same of the sixth through 11th resistors 106 through 111, and γ can be expressed as follows.

$$\gamma=(R+R+\ldots+4R)/(4R+R+\ldots+92R)=8R/100R=0.08 \quad \text{(Equation 6)}$$

As shown above, the ratio γ is equal to the ratio of the resistance values R1/R2 in the upper limit marginal check voltage generating circuit 20. Therefore, in the circuit of FIG.

2, the resistors 22 and 23 are removed, and the first through fifth resistors 101 through 105 are used in place of the resistor 22 while the sixth through 11th resistors 106 through 111 are used in place of the resistor 23. This method permits elimination of the two resistors 22 and 23.

Figure 4:
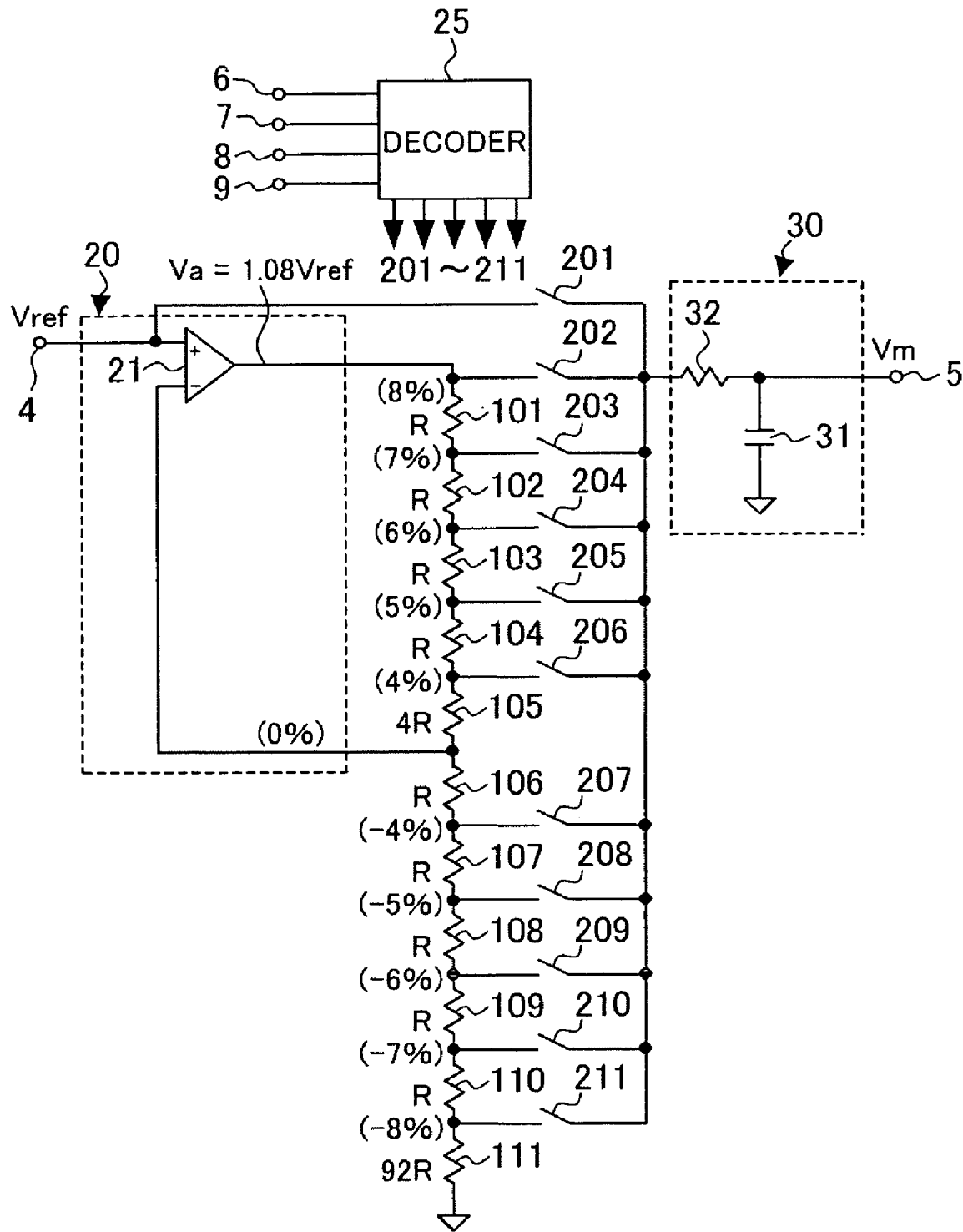
FIG. 4 is an illustration showing the third example of the marginal check voltage setting circuit of the power-supply device of the present invention.

FIG. 4 shows the third example of the marginal check voltage setting circuit 12 in the present invention. The marginal check voltage setting circuit 12 in this example is the same marginal check voltage setting circuit 12 shown in FIG. 3 but with the first-order lag circuit 30 connected to the output side. In this example, the first-order lag circuit 30 uses the CR filter composed of the capacitor 31 and the resistor 32.

When one of the switches of the marginal check voltage setting circuit is closed, the marginal check voltage Vm changes stepwise. Due to the change, the output voltage of the power-supply device Vout may be caused to overshoot or undershoot. Such overshoot or undershoot is likely to occur in the case that the transient variation of the output voltage Vm in the marginal check voltage setting circuit 12 happens more quickly than the response in the negative feedback control loop of the power-supply device. In this example, therefore, in order to avoid such overshoot or undershoot in output of the power-supply device, the first-order lag circuit 30 is provided on the output side of the marginal check voltage setting circuit 12, preventing occurrence of overshoot or undershoot when the output voltage changes in a step form and improving operating stability of the negative feedback control loop of the power-supply device. This configuration proves effective in enhancing voltage stability at the time the marginal check voltage is changed.

Figure 5:
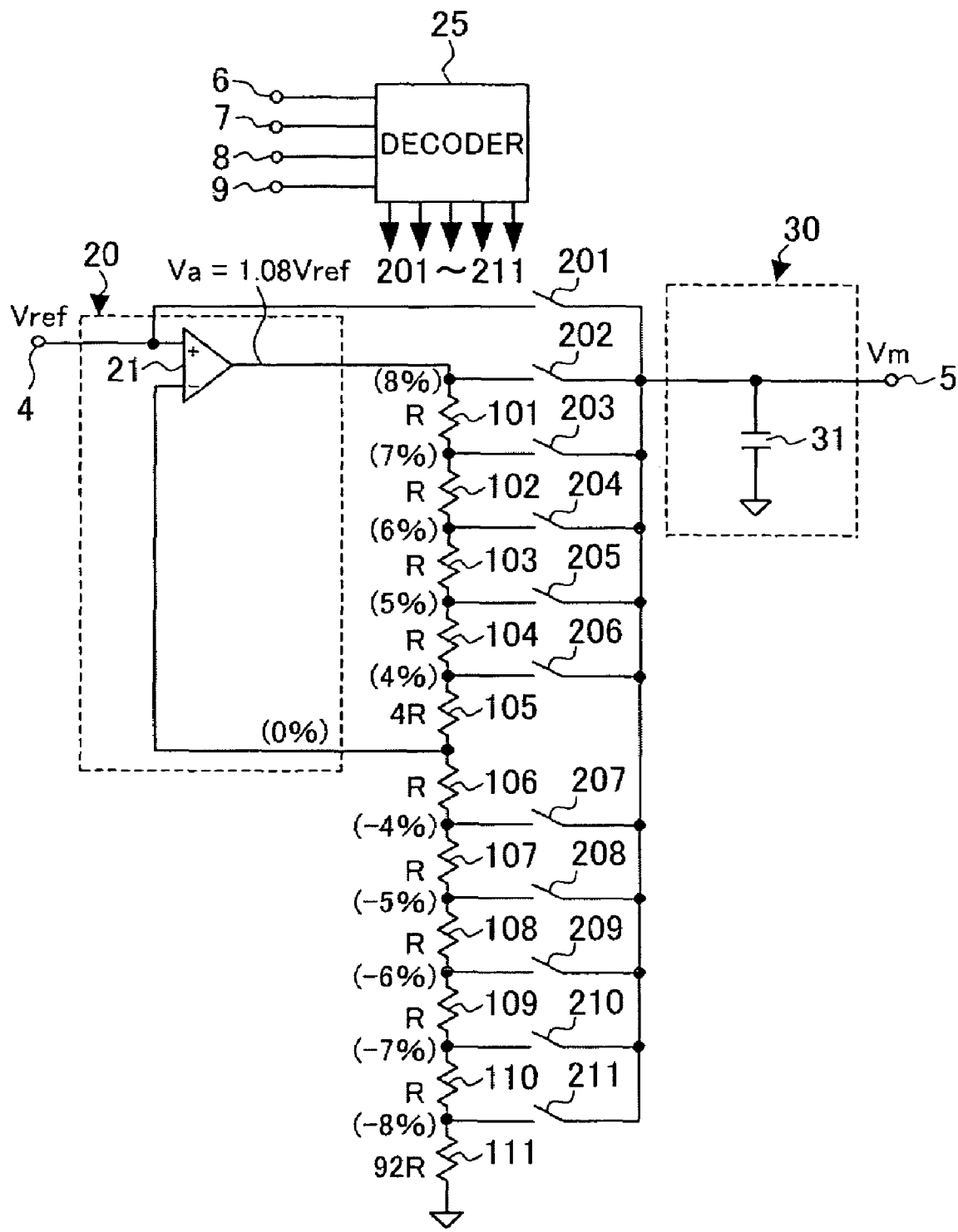
FIG. 5 is an illustration showing the fourth example of the marginal check voltage setting circuit of the power-supply device of the present invention.

FIG. 5 shows the fourth example of the marginal check voltage setting circuit 12 in the present invention. In this example, the first-order lag circuit 30 is provided on the output side of the marginal check voltage setting circuit, but the resistor has been substituted for by a switch of the switch array. MOS transistors are used for the switches 201 through 211 of the marginal check voltage setting circuit, and the on-resistance of these MOS transistors has been utilized as the resistor for the first-order lag circuit. In this example, the first-order lag circuit can be realized without the use of the resister 32 as shown in FIG. 4.

When several tens of microseconds are required for the first-order lag time constant, it is necessary to increase the capacity of the capacitor 31 and the resistance value of the resistor 32. To increase the on-resistance of MOS transistors, it will suffice to change the width-to-length ratio of the gate of MOS transistors. To increase the capacity of the capacitor, it will be effective to increase apparent capacity by utilizing the Miller effect by means of an inverting amplifier.

Hereinafter, the output available through the first-order lag circuit is to be treated as the output of the marginal check voltage setting circuit 12.

Figure 6:
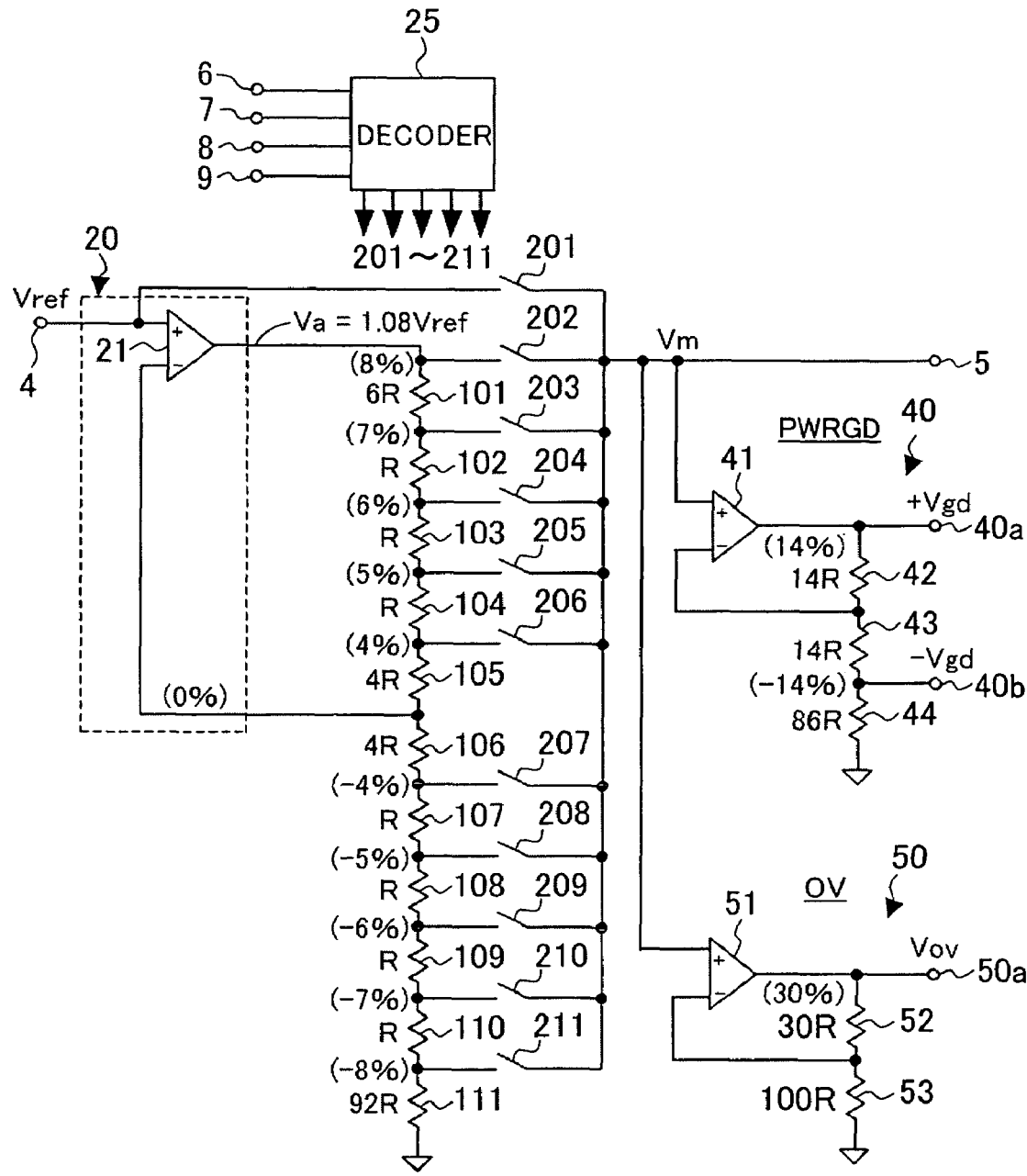
FIG. 6 is an illustration showing the fifth example of the marginal check voltage setting circuit of the power-supply device of the present invention.

FIG. 6 shows the fifth example of the marginal check voltage setting circuit 12 in the present invention. In this example, the marginal check voltage setting circuit 12 is connected with the power-good circuit 40 and over-voltage detection circuit 50. The power-good circuit 40 is employed to send a signal to the load side as to whether the output of the power-supply device is within a desired voltage range as specified. For this purpose, the power-good determination reference voltage is obtained from the output terminal of the marginal check voltage setting circuit 12. The power-good determination reference voltage is usually in the voltage range spreading upward and downward centering on the reference voltage Vref. The over-voltage detection circuit 50 is used to avoid breaking of electronic devices and components in case over-voltage is caused due to rise of the output voltage of the power-supply device. For this purpose, too, the over-voltage detection reference voltage is obtained from the output terminal of the marginal check voltage setting circuit 12. The over-voltage detection reference voltage is usually a value higher by several tens percent than the reference voltage Vref.

According to the present example, the power-good circuit 40 and the over-voltage detection circuit 50 accept the input of the marginal check voltage Vm to set up the reference voltage. Accordingly, the reference voltage used in the power-good circuit 40 and the over-voltage detection circuit 50 is set based on the marginal check voltage Vm. In other words, the reference voltage from the power-good circuit 40 and the over-voltage detection circuit 50 is linked to the marginal check voltage Vm.

In this example, the power-good determination reference voltage ±Vgd output from the power-good circuit 40 is ±14% of the marginal check voltage Vm.

The power-good circuit 40 is configured as a non-inverting amplifier circuit composed of the operational amplifier 41 and the resistors 42, 43, and 44. Now, the resistance values are assumed 14R for the resistor 42, 14R for the resistor 43, and 86R for the resistor 44.

The operational amplifier 41 accepts input of the marginal check voltage Vm from the marginal check voltage setting circuit 12 and sets the power-good determination reference voltage +Vgd and −Vgd expressed by the following equations.

$$+Vgd = \{1 + 14R/(14R + 86R)\} \cdot Vm \quad \text{(Equation 7)}$$
$$= (1 + 14R/100R) \cdot Vm$$
$$= 1.14\,Vm$$

$$-Vgd = \{86R/(14R + 86R)\} \cdot Vm \quad \text{(Equation 8)}$$
$$= 86R/100R \cdot Vm$$
$$= 0.86\,Vm$$

In this example, the over-voltage detection reference voltage Vov output from the over-voltage detection circuit 50 is +30% of the marginal check voltage Vm. The over-voltage detection circuit 50 is configured as a non-inverting amplifier circuit composed of the operational amplifier 51 and the resistors 52 and 53. Now, the resistance values are assumed 30R for the resistor 52 and 100R for the resistor 53.

The operational amplifier 51 accepts input of the marginal check voltage Vm from the marginal check voltage setting circuit 12 and sets the over-voltage detection reference voltage Vov expressed by the following equation.

$$Vov = (1 + 30R/100R) \cdot Vm = 1.3\,Vm \quad \text{(Equation 9)}$$

In the present example, each of the five resistors 42 through 44, 52 and 53 included in the power-good circuit 40 and the over-voltage detection circuit 50 is composed of a plurality of unit resistors. Assuming the resistance value of the unit resistor to be "R," the resistance value of the resistors 42 and 43 in the power-good circuit 40 is 14R respectively, each resistor being composed of 14 pieces of unit resistors connected in series. The resistor 44 has the resistance value of 86R with 86 pieces of unit resistors connected in series. The resistance value of the resistor 52 of the over-voltage detection circuit 50 is 30R with 30 pieces of unit resistors connected in series. The resistor 53 has the resistance value of 100R with 100 pieces of unit resistors connected in series.

Figure 7:
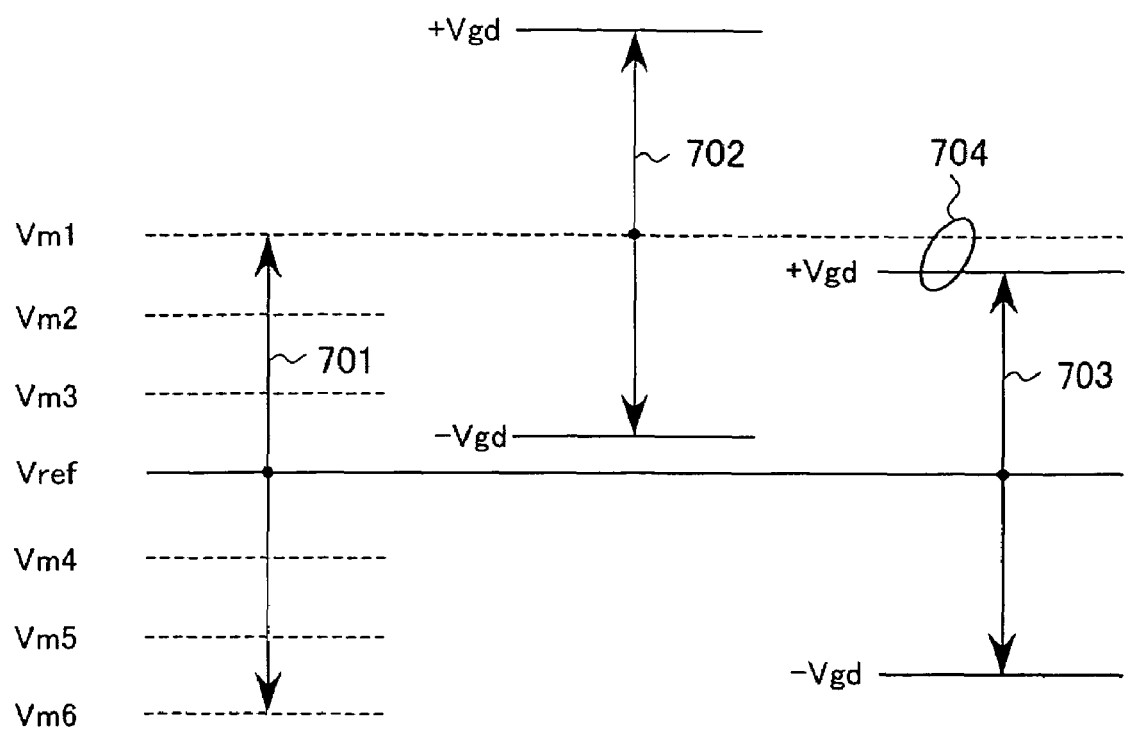
FIG. 7 is an illustration showing the relations between the marginal check voltage and the power-good voltage of the power-supply device of the present invention.

With reference to FIG. 7, the operation of the power-good circuit is explained. FIG. 7 shows the relations between the range 701 of the marginal check voltage Vm and the ranges 702 and 703 of the power-good determination reference voltage Vgd. In the present invention, even if the marginal check voltage Vm may be set at various voltage values such as Vm1 through Vm6, the power-good determination reference voltage Vgd will be set, linked to the marginal check voltage Vm. When the marginal check voltage is Vm1, for example, the range 702 of the power-good determination reference voltage Vgd is set based on the voltage Vm1. Accordingly, the marginal check voltage Vm1 is certain to be included in the range 702 of the power-good determination reference voltage Vgd. In this way, the present invention makes it possible to output a normal power-good signal while the marginal check is going on.

In case the power-good determination reference voltage Vgd is not linked to the marginal check voltage Vm, the power-good determination reference voltage Vgd is set independently of the marginal check voltage Vm. When the marginal check voltage is Vm1, for example, let's assume that the range 703 of the power-good determination reference voltage Vgd has been set based on the reference voltage Vref. In this case, the marginal check voltage Vm1 exceeds the range 703 of the power-good determination reference voltage Vgd. That is, a reversal 704 of the set voltage is caused. In such a case, a normal power-good signal can not be output while the marginal check is being performed.

With respect to FIG. 7, explanation has been made concerning the relations between the marginal check voltage Vm1 through Vm6 and the power-good determination reference voltage. The same applies also to the relations between the marginal check voltage Vm1 through Vm6 and the over-voltage detection reference voltage.

Figure 8:
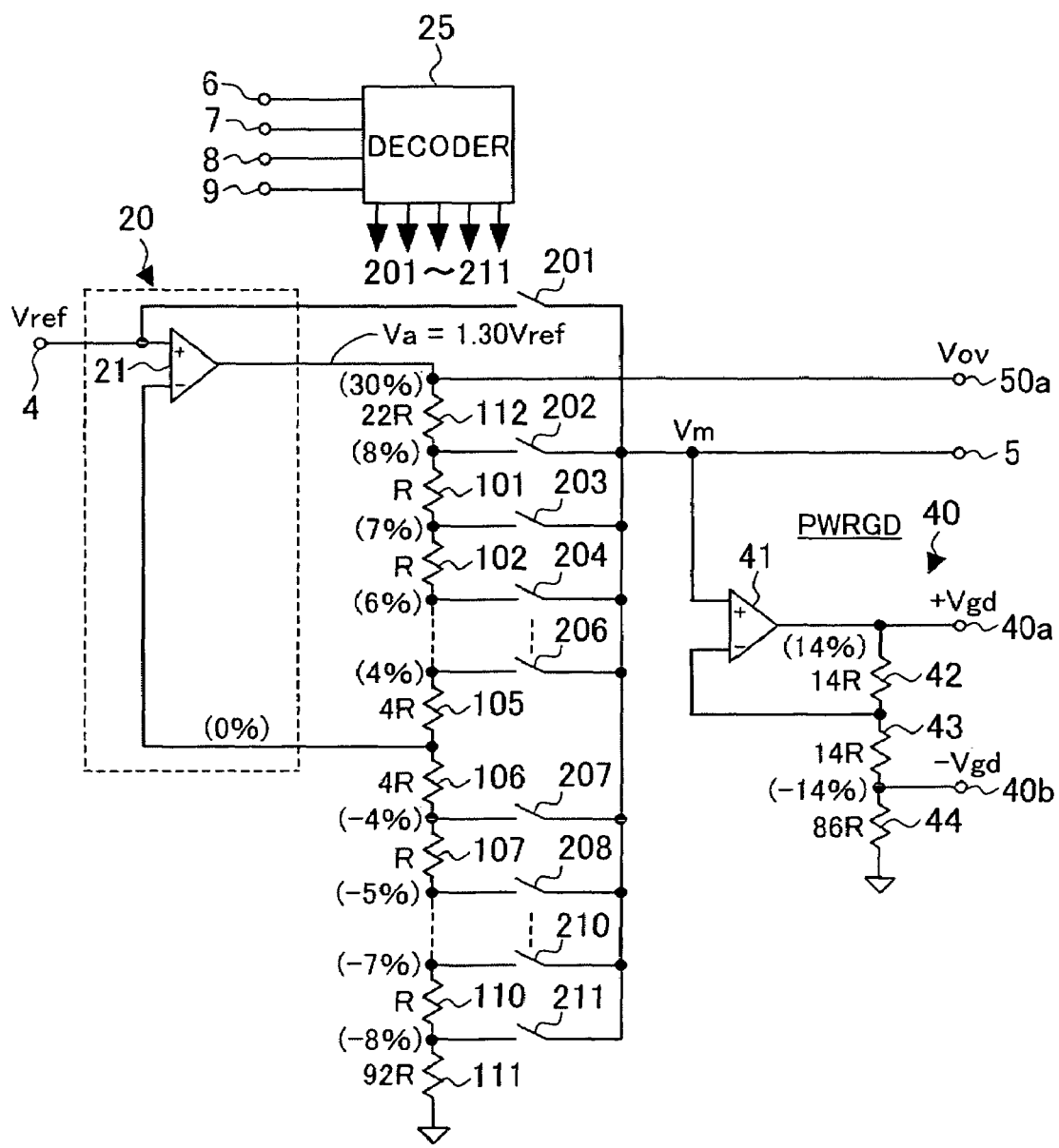
FIG. 8 is an illustration showing the sixth example of the marginal check voltage setting circuit of the power-supply device of the present invention.

FIG. 8 shows the sixth example of the marginal check voltage setting circuit 12 in the present invention. In this example, the over-voltage detection reference voltage Vov is to be set at 30% higher than the reference voltage Vref or 1.30·Vref. In this example, the over-voltage detection reference voltage Vov is not linked to the marginal check voltage Vm. In other words, the over-voltage detection reference voltage Vov is not set on the basis of the marginal check voltage Vm but on the basis of the reference voltage Vref. Most important is that the detection of over-voltage is intended to avoid applying any higher voltage than is allowable for the load, such as absolute maximum rated voltage, to the load connected to the power-supply device, and for this reason, it is preferable that the over-voltage detection reference voltage Vov be set on the basis of the reference voltage Vref.

In this example, the 12th resistor 112 having a resistance value of 22R is provided between the output terminal of the operational amplifier 21 and the first resistor 101. When the ratio of the summation of the resistance values of the 12th resistor 112 and the first through fifth resistors 101 through 105 to the summation of the resistance values of the sixth through 11th resistors 106 through 111 is assumed to be γ, γ can be expressed as follows.

$$\gamma = (22R + R + \ldots + 4R)/(4R + R + \ldots + 92R) = 30R/100R = 0.30 \quad \text{(Equation 10)}$$

The upper limit marginal check voltage available at the output terminal of the upper limit marginal check voltage generating circuit 20 is obtained by the following equation.

$$Va = (1 + 30R/100R) \cdot Vref = 1.30 \cdot Vref \quad \text{(Equation 1)}$$

This upper limit marginal check voltage 1.30·Vref is used as the over-voltage detection reference voltage Vov. In this example, the over-voltage detection circuit 50 as shown in FIG. 6 is not necessary. The power-good circuit 40 is the same as the example shown in FIG. 6 in terms of circuitry and reference voltage.

Figure 9:
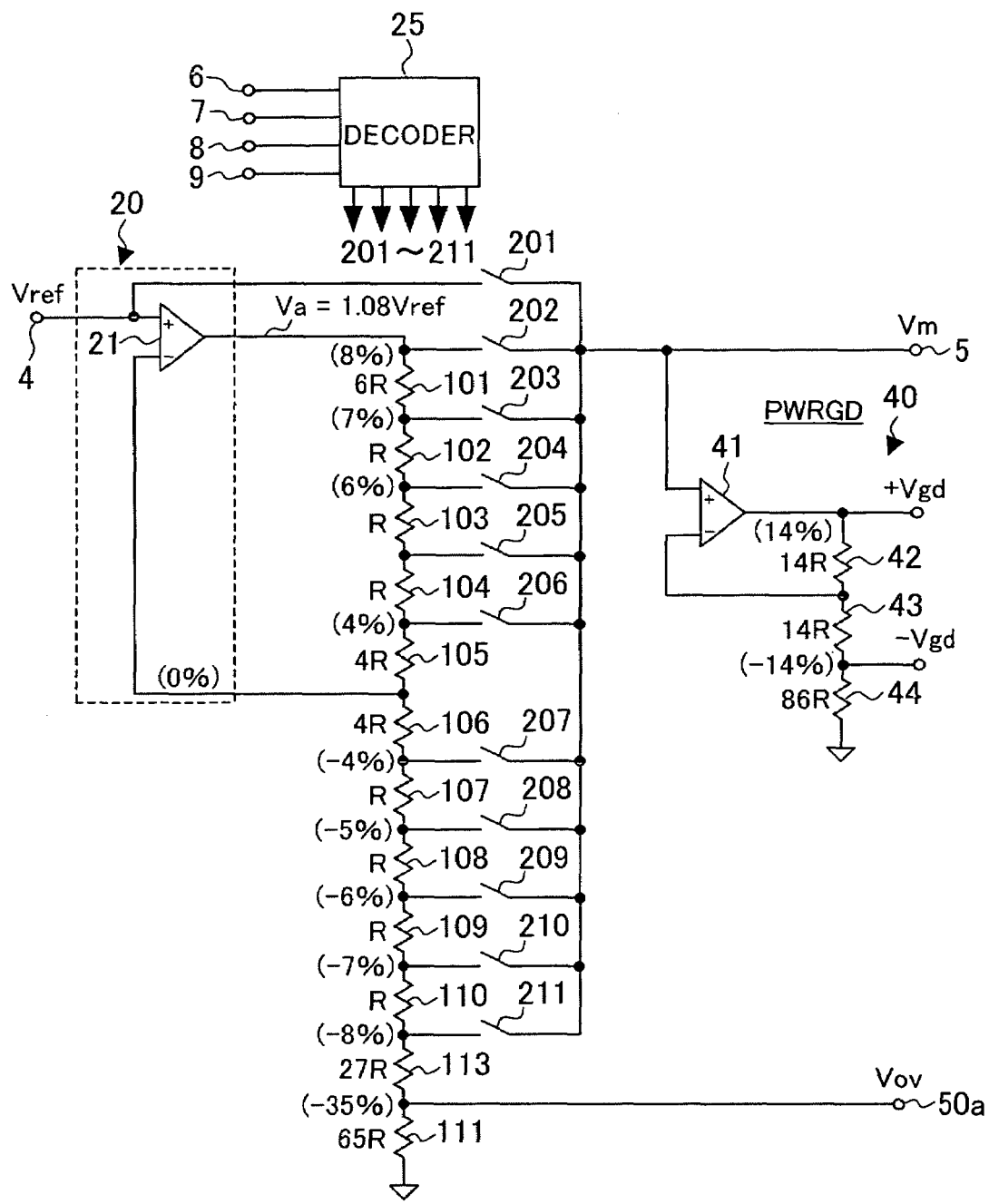
FIG. 9 is an illustration showing the seventh example of the marginal check voltage setting circuit of the power-supply device of the present invention.

FIG. 9 shows the seventh example of the marginal check voltage setting circuit 12 in the present invention. The example in FIG. 8 uses, as the over-voltage detection reference voltage, a voltage 30% higher than the reference voltage Vref or 1.30·Vref. However, if the voltage of 1.30·Vref exceeds the allowable operation range of IC, it is necessary to use a lower reference voltage. Therefore, the over-voltage detection reference voltage in the present example is set at a voltage 30% higher than half of the reference voltage Vref or 0.65·Vref. In this case, a voltage after the output voltage Vout is divided half should be used as the feedback voltage Vfb applied to the feedback voltage connection terminal 3 in FIG. 1.

In this example, the 13th resistor 113 is provided between the 10th resistor 110 and the 11th resistor 111. The 11th resistor 111 has a resistance value of 65R, and the 13th resistor has a resistance value of 27R. The voltage at the midpoint between the 13th resistor 113 and the 11th resistor 111 is taken out as the over-voltage detection reference voltage Vov. The over-voltage detection reference voltage Vov is 43% lower than the upper limit marginal check voltage 1.08·Vref and 35% lower than the reference voltage Vref or 0.65%·Vref. Accordingly, a voltage 30% higher than the half of the reference voltage Vref, namely 0.65·Vref, is available as the over-voltage detection reference voltage.

Method of generating the over-voltage detection reference voltage is not limited to the embodiments described above by way of examples, but is practicable by application of various other embodiments.

In the foregoing examples, the over-voltage detection reference voltage Vov, when obtained based on the reference voltage Vref, has been taken out from the resistor network of the marginal check voltage setting circuit 12. The power-good determination reference voltage, when obtained based on the reference voltage Vref, can likewise be taken out from the resistor network of the marginal check voltage setting circuit 12.

Figure 10:
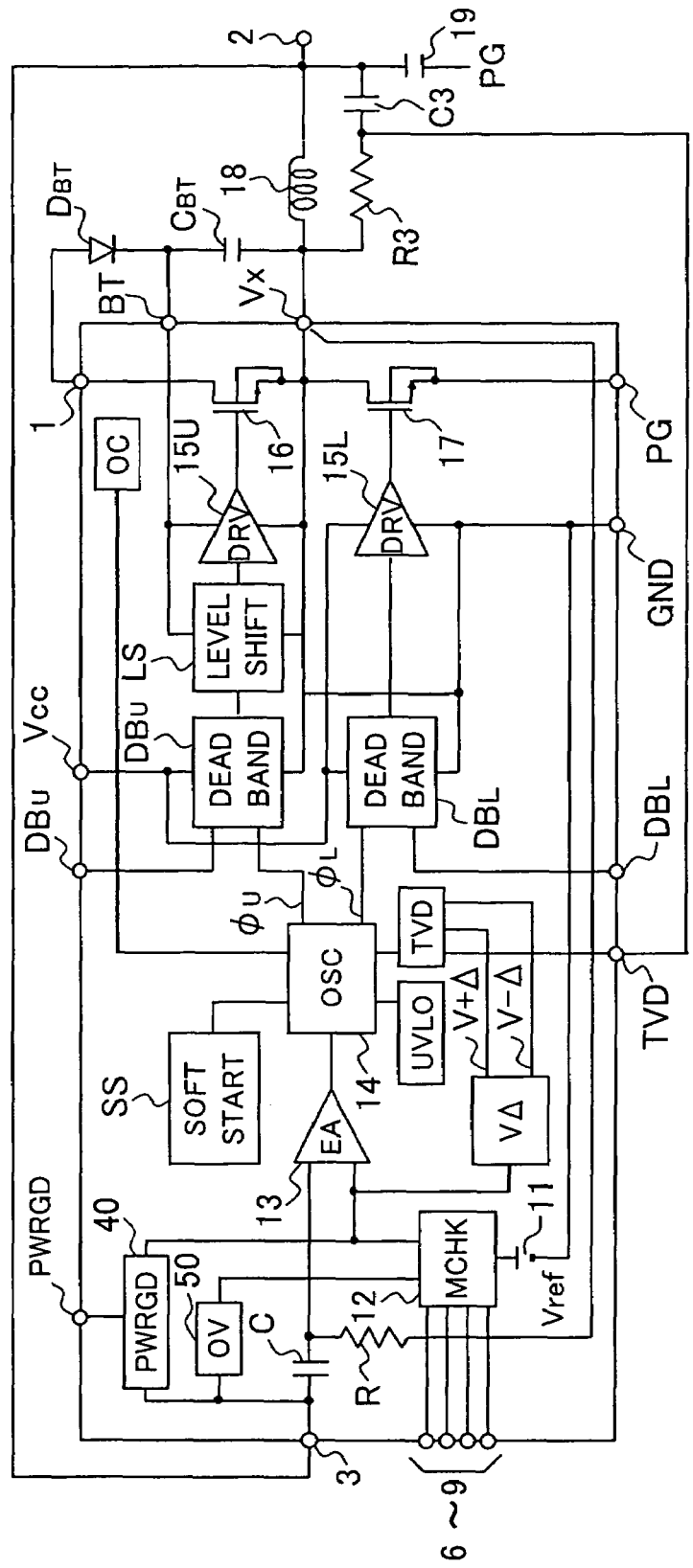
FIG. 10 is an illustration showing the first-order feedback control method applied to the power-supply device of the present invention.

FIG. 10 shows an example of the first-order feedback control method power-supply device. This power-supply device is equivalent to the power-supply device shown in FIG. 14 in Japanese published and unexamined patent application gazette No. 80985/2004 but additionally provided, for example, with a marginal check voltage setting circuit 12 as shown in FIG. 8 in the present invention.

The power-supply device according to the present example comprises the CR smoothing filter composed of the capacitor C and resistor R connected to the feedback voltage connection terminal 3, power-good circuit 40, over-voltage detection circuit 50, marginal check voltage setting circuit 12, reference voltage source 11 creating the reference voltage Vref, error amplifier 13, pulse width modulation oscillator 14, overcurrent detection circuit OC, soft-start circuit SS, under-voltage lockout circuit UVLO, upper and lower limit voltage generating circuit VΔ, transient variation detection circuit TVD, dead band circuits DBU and DBL, level shift circuit LS, drivers 15U and 15L, and upper-side and lower-side power MOSFETs 16 and 17; all being integrated on a single semiconductor substrate. The power-supply device in this example further comprises the LC smoothing filter composed of the coil 18 and capacitor 19 connected to the output side of the power MOSFETs 16 and 17, CR circuit composed of the capacitor C3 and resistor R3 to detect load fluctuation in the transient variation detection circuit TVD, and boost circuit composed of the diode DBT and the capacitor CBT.

The input terminal 1 of the power-supply device is connected to the drain of the upper-side power MOSFET 16, and the output terminal 2 of the power-supply device is connected to the output side of the LC smoothing filter.

The input terminal 1 and the power source terminal Vcc may be supplied with the same voltage, but it is also no problem to supply different voltages, for example, 12V for the input terminal and 5V for the power source terminal Vcc. The pulse width modulation oscillator 14 is to constrain transient variations by forcibly switching over the pulse width, namely the duty, of the pulse width modulation oscillator 14 to 100%, or 0% when the transient variation detection circuit TVD detects transient variation in the output voltage.

Explanations hereinabove have been made taking the power-supply device of the first-order feedback control method, but the present invention is also applicable to the voltage mode method, the currency mode method, and other power-supply control methods.

Figure 11:
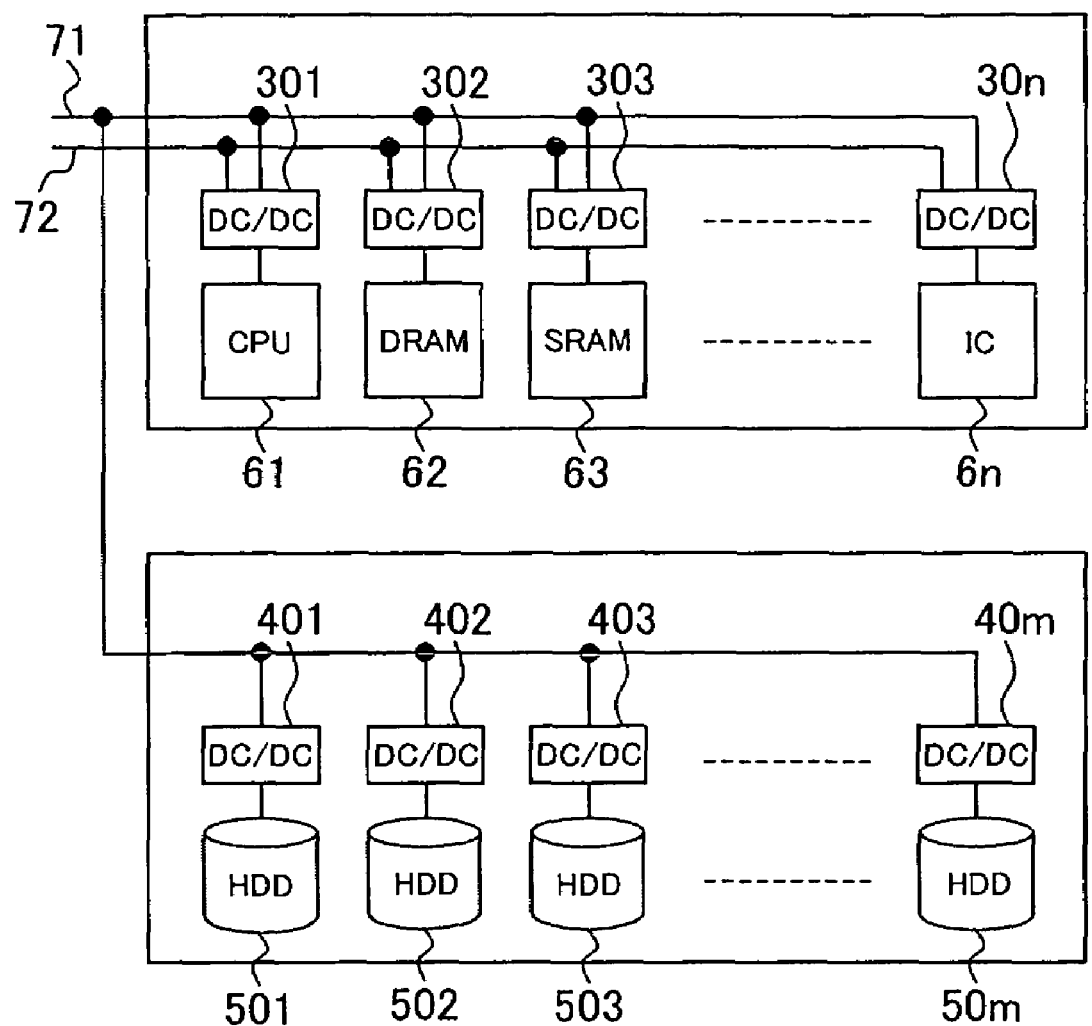
FIG. 11 is an illustration showing an example of the power-supply device of the present invention applied to an information processing equipment equipped with HDD devices.

FIG. 11 shows the power-supply devices in the present invention, that is, the DC-DC converters, applied to the information processing equipments controlling hard disk drives (HDDs). The information processing equipments comprise CPUs 61, DRAMs 62, SRAMs 63, logic ICs 6n, and single or plural HDDs that, through signal lines (not shown in FIG. 11), read and write the information recorded in DRAMs 62 or SRAMs 63.

These devices are connected with the power source cable 71 and the signal line 72 feeding digital codes. The power-supply devices 301 - 30n stay connected between the power source line 71 and the signal line 72. The HDD devices 501 - 50m are connected with certain power-supply devices 401 - 40m which are different from the ones in the present invention.

The power-supply devices 301 - 30n have a built-in marginal check voltage setting circuit respectively, and when given digital codes through the signal line, the power-supply devices can change the DC voltage values for many devices at the same time. According to this example, therefore, it is possible to perform voltage marginal check for many devices without using any external hardware. When the voltage marginal check is not exercised, the power-supply device in this example functions as a step-down DC-DC converter.

In the example shown in FIG. 11, it was assumed the same digital code was given to all the devices through the signal line 72. However, by providing a signal line for each device, it becomes possible to feed different source voltage for each device. For example, if the power-supply devices 301 - 303 connecting to CPU 61, DRAM 62, and SRAM 63 are given different digital codes respectively, each of the devices can be provided with a source voltage different from one another.

It is needless to say that the power-supply device according to the present invention is applicable not only to the information processing equipments controlling hard disk drives (HDDs), but also to a voltage regulator module (VRM), a DC-DC converter for mobile devices, a DC-DC converter for general use, and other similar devices.

The power-supply device above-mentioned is configured as a non-isolation type DC-DC converter but it may well be configured as an isolation type DC-DC converter. Such an isolation type DC-DC converter may include one-transistor forward type, two-transistor forward type, push-pull type, half-bridge type, full-bridge type, and others.

While the preferred embodiments and examples of the power-supply device in accordance with the present invention are described and illustrated hereinbefore, it will be appreciated that the present invention is by no means limited to the aforementioned embodiments and examples and that those skilled in the art will easily understand various modifications can be made not departing the scope of the present invention described in the claims.

What is claimed is:

1. A power-supply device functioning as a step-down DC-DC converter which accepts a DC input voltage at an input terminal and delivers stepped-down output voltage from an output terminal, comprising:

a marginal check voltage setting circuit which inputs a reference voltage to set a desired marginal check voltage, an error amplifier which with the input of the marginal check voltage and said output voltage generates the difference between the two and outputs it as an error signal, a pulse width modulation oscillator which modulates said output from the error amplifier in pulse width, a driver circuit which generates driving signals from the pulse signals from the pulse width modulation oscillator, and a pair of power semiconductor switching devices which steps down said DC input voltage in accordance with the driving signals from the driver circuit to generate said DC output voltage, wherein said marginal check voltage setting circuit includes an upper limit marginal check voltage generating circuit which inputs a reference voltage to generate upper limit marginal check voltage, a resistor network comprising a plurality of series-connected resistors, and an array of switches including a plurality of parallel-connected switches one end of each of said switches being connected to a different node of said resistors, the other end of each of said switches being connected in common to an output terminal of said marginal check voltage setting circuit, and a desired marginal check voltage increasing or decreasing relative to the reference voltage by a certain ratio is available by closing one of said plurality of switches.

2. The power-supply device of claim 1, wherein by closing one of the switches of the switch array said upper limit marginal check voltage goes through at least one of said plurality of resistors and thereby increases or decreases to arrive at said desired marginal check voltage.

3. The power-supply device of claim 1, wherein the resistor network comprises a plurality of series-connected unit resistors and each of said plurality of resistors comprises one piece of unit resistor or a plurality of series-connected unit resistors.

4. The power-supply device of claim 3, wherein the value of resistance of said unit resistor is so designed that the amount of voltage drop by the unit resistor corresponds to 1% of the reference voltage.

5. The power-supply device of claim 1, wherein said marginal check voltage generating circuit comprises an operational amplifier and two units of resistors and also the non-inverting amplifier configured with negative feedback from the midpoint of the two units of resisters to said operational amplifier.

6. The power-supply device of claim 5, wherein each of the two units of resistors of said upper limit marginal check voltage generating circuit is composed of a plurality of series-connected resistors included in said resistor network, a negative feedback to said operational amplifier being made from the connection point having a voltage equal to the reference voltage in said resistor network.

7. The power-supply device of claim 1, wherein said upper limit marginal check voltage generating circuit, when not performing voltage marginal check, outputs the input reference voltage to said error amplifier as it is.

8. The power-supply device of claim 1, wherein said marginal check voltage setting circuit is input from the outside with a digital code, based on which one of said plurality of switches is closed.

9. The power-supply device of claim 1, wherein an over-voltage detection circuit to set over-voltage detection reference voltage is provided at the output terminal of said marginal check voltage setting circuit.

10. The power-supply device of claim 9, wherein said over-voltage detection reference voltage is set in accordance with said marginal check voltage.

11. The power-supply device of claim 9, wherein said over-voltage detection reference voltage is the upper limit marginal check voltage generated in the upper limit marginal check voltage generating circuit.

12. The power-supply device of claim 9, wherein said over-voltage detection reference voltage is set in accordance with said reference voltage.

13. The power-supply device of claim 9, wherein said over-voltage detection reference voltage is set based on the half value of said reference voltage.

14. The power-supply device of claim 1, wherein a power-good circuit to set a power-good determination reference voltage is provided at the output terminal of said marginal check voltage setting circuit.

15. The power-supply device of claim 14, wherein said power-good determination reference voltage is set in accordance with said marginal check voltage.

16. The power-supply device of claim 1, wherein said marginal check voltage setting circuit, error amplifier, and pulse width modulation oscillator are mounted on one integrated circuit.

17. The power-supply device of claim 1, further comprising:
   a power-good determining circuit connected to the output terminal of said marginal check voltage setting circuit to generate a power-good determining reference voltage,
   wherein the power-good circuit generates said power-good determining reference voltage in accordance with said marginal check voltage output from said marginal check voltage setting circuit.

18. The power-supply device of claim 17, further including an over-voltage detection circuit connected to the output terminal of said marginal check voltage setting circuit to generate an over-voltage detection reference voltage.

19. The power-supply device of claim 18, wherein said over-voltage detection circuit is to set said over-voltage detection reference voltage in accordance with said marginal check voltage or reference voltage which are output from said marginal check voltage setting circuit.

20. An information processing equipment comprising a power-supply device, a CPU and memory to receive DC voltage from the power-supply device, and a hard disk unit to store the data of the memory, wherein the power-supply device functioning as a step-down DC-DC converter which accepts a DC input voltage at an input terminal and delivers stepped-down output voltage from an output terminal, comprises a marginal check voltage setting circuit which, based on the input reference voltage, sets a desired marginal check voltage, an error amplifier which with the input of the marginal check voltage and said output voltage outputs the difference between the two as an error signal, a pulse width modulation oscillator which modulates said output from the error amplifier in pulse width, a driver circuit which generates driving signals from the pulse signals from the pulse width modulation oscillator, and a pair of power semiconductor switching devices which steps down said DC input voltage in accordance with the driving signals from the driver circuit to generate said DC output voltage;
   wherein said marginal check voltage setting circuit includes an upper limit marginal check voltage generating circuit which inputs a reference voltage to generate upper limit marginal check voltage, a resistor network comprising a plurality of series-connected resistors, and an array of switches including a plurality of parallel-connected switches, one end of each of said switches being connected to a different node of said resistors, the other end of each of said switches being connected in common to an output terminal of said marginal check voltage setting circuit, and a desired marginal check voltage increasing or decreasing relative to the reference voltage by a certain ratio is available by closing one of said plurality of switches.

* * * * *